(12) United States Patent
Shabsigh (10) Patent No.: US 11,180,210 B2
(45) Date of Patent: Nov. 23, 2021

(54) METHOD FOR PRODUCING A BICYCLE SEAT, APPARATUS USED IN SAID PROCESS AND BICYCLE SEAT PRODUCED THEREBY

(71) Applicant: Ridwan Shabsigh

(72) Inventor: Ridwan Shabsigh, Bronxville, NY (US)

( * ) Notice: Subject to any disclaimer, the term of this patent is extended or adjusted under 35 U.S.C. 154(b) by 239 days.

(21) Appl. No.: 16/469,688

(22) PCT Filed: Dec. 15, 2017

(86) PCT No.: PCT/US2017/066688
§ 371 (c)(1),
(2) Date: Jun. 14, 2019

(87) PCT Pub. No.: WO2018/112353
PCT Pub. Date: Jun. 21, 2018

(65) Prior Publication Data
US 2020/0079452 A1 Mar. 12, 2020

Related U.S. Application Data

(60) Provisional application No. 62/434,605, filed on Dec. 15, 2016.

(51) Int. Cl.
*B62J 1/00* (2006.01)
*B62K 19/30* (2006.01)

(52) U.S. Cl.
CPC .............. *B62J 1/005* (2013.01); *B62K 19/30* (2013.01)

(58) Field of Classification Search
CPC ... B62J 1/08; B62J 1/005; B62J 1/007; B62K 19/30
See application file for complete search history.

(56) References Cited

U.S. PATENT DOCUMENTS

| | | | | |
|---|---|---|---|---|
| 4,541,668 A | * | 9/1985 | Rouw | B62J 1/002 297/201 |
| 5,286,082 A | * | 2/1994 | Hanson | B62J 1/007 297/195.1 |

(Continued)

FOREIGN PATENT DOCUMENTS

EP 1 880 933 A2 1/2008
KR 2016 0006065 A 1/2016

*Primary Examiner* — Jacob D Knutson
*Assistant Examiner* — Michael R Stabley
(74) *Attorney, Agent, or Firm* — Norris McLaughlin, P.A.

(57) ABSTRACT

A device for individualizing a bicycle seat comprises a plurality of individually moving parts collectively having the shape of at least the top surface of a generic bicycle seat, the individually moving parts being movable relative to one another in the x-, y- and z-directions to adjust the generic bicycle seat to an adjusted final position that suits the individual comfort tastes of the user of said individualized bicycle seat; and a plurality of sensors connected to the plurality of individually moving parts to detect all adjustments made to the generic bicycle seat to achieve the adjusted final position. Information from the sensors can be downloaded to a computer to form a 3D data file that can be 3D-printed to an individualized bicycle seat. The invention also relates to a method of using the device, the individualized bicycle seat produced, and to a bicycle containing the individualized bicycle seat.

20 Claims, 11 Drawing Sheets

(56) References Cited

U.S. PATENT DOCUMENTS

| | | | | |
|---|---|---|---|---|
| 5,988,740 | A * | 11/1999 | Caraballo | B62J 1/002 297/201 |
| 6,357,825 | B1 * | 3/2002 | Bavaresco | B62J 1/08 297/201 |
| 6,786,542 | B1 * | 9/2004 | Nuzzarello | B62J 1/005 297/195.1 |
| 7,494,181 | B2 * | 2/2009 | Tucker | B62J 1/005 248/298.1 |
| 8,998,314 | B2 * | 4/2015 | Eldredge | B62J 1/007 297/201 |
| 9,227,681 | B2 * | 1/2016 | Eldredge | B62J 1/04 |
| 9,498,067 | B2 * | 11/2016 | Gloeckl | A47C 9/002 |
| 10,286,818 | B2 * | 5/2019 | Line | B60N 2/99 |
| 2003/0038515 | A1 * | 2/2003 | Martin | B62J 1/10 297/195.1 |
| 2008/0179925 | A1 * | 7/2008 | Chuang | B62J 1/005 297/214 |
| 2011/0260511 | A1 * | 10/2011 | Sirjord | B62J 1/005 297/201 |
| 2012/0274043 | A1 | 11/2012 | Lee et al. | |
| 2014/0333102 | A1 | 11/2014 | Eldredge | |

* cited by examiner

METHOD FOR PRODUCING A BICYCLE SEAT, APPARATUS USED IN SAID PROCESS AND BICYCLE SEAT PRODUCED THEREBY

PRIORITY CLAIM

This application is a 371 of PCT/US2017/066688, filed Dec. 15, 2017, which claims priority benefit under 35 U.S.C. § 119(e) of the U.S. Provisional Patent Application No. 62/434,605, filed Dec. 15, 2016, the disclosures of which are incorporated herein by reference.

BACKGROUND OF THE INVENTION

1. Field of the Invention

The present invention relates to a novel method for producing a bicycle seat, to a novel apparatus for carrying out the novel method and to a bicycle seat produced using the novel method.

2. Description of Related Art

Biking is a widespread activity used for transportation, leisure, fitness and sports. Although biking has substantial fitness and health benefits, sitting on the bike seat (or saddle) has been associated with discomfort, erectile dysfunction (ED) and other sexual, urinary dysfunctions and other dysfunctions. Therefore, there is a need to design, develop and manufacture bike seats that are individually-fit, comfortable and may eliminate or reduce the risks for ED, sexual and urinary dysfunctions and other dysfunctions.

Over the years there have been many attempts to develop "healthy and comfortable" bike seats. However, all such efforts have ended up with mass production of seats that do not have proof of comfort or safety for individuals.

The anatomy of the "butt" or "perineum" varies from person to person in size, shape, distribution of weight; thus creating variations in perceived comfort, pressure points location, intensity and distribution in different individuals on different seats.

Oehler, U.S. Pat. No. 7,273,250, describes a method for individually adapting a bicycle seat. The method involves measuring the local pressure of a user's buttocks on the surface of a bicycle seat by placing a film with pressure-measuring sensors between the bicycle seat and the user's buttocks and, thereafter, adapting the bicycle seat on the basis of a pressure distribution output to reduce problematic pressure zones by, for example, adding softer padding in those problematic pressure zones.

Niederberger, U.S. Pat. No. 9,022,954, describes a method for mapping pressures on the perineum of a user against the surface of a bicycle seat during a ride. The method involves placing sensors between the bicycle seat surface and the perineum region of the user and using a pressure distribution output, in this case, to assess a risk of erectile dysfunction for bicycle riders. At column 6, lines 56-62, Niederberger discusses "modifying the bicycle seat surface geometry to minimize the bicycle seat erectile dysfunction risk factor." Niederberger discusses modifying a seat surface geometry or material construction for this purpose, and gives the addition of padding as an example.

Petty, U.S. Patent Publication No. 2017/0073028, describes an adjustable bike seat. Two saddle halves are independently bolted to a chassis. The saddle halves and the chassis have slots for the bolts allowing the saddle halves to be bolted into different positions relative to one another and the chassis, thereby allowing the saddle halves to be adjusted to suit individual tastes. In addition, wedges ("shims") can be inserted between a saddle half and the chassis to change the height of the saddle half above the chassis. However, since the shims are to be held in place by the same bolts holding the saddle halves in place, changing the height of the saddle halves requires the entire starting configuration be deconstructed, the bolts removed, the shim positioned, and the bolts reinserted and tightened. Thus, while the saddle halves are themselves movable with respect to one another in a x- and y-direction, the saddles are not technically movable in the z-direction, but, instead, the entire device must be deconstructed and reconstructed using the shim inserts to effect a change in the z-direction. Further, no adjustment to the saddle position in any direction can be practically accomplished while the user is using the device. Instead, the user must dismount, the changes effected and only then can the user remount. This makes the task of achieving that "perfect feel" all the more difficult. A device that has parts capable themselves of movement in the x-, y- and z-directions, and which is capable of adjustment in any of these directions while the user is seated and using the device would be very advantageous. The publication also does not mention the capture of adjustments desired by the user to support a 3D data file for the preparation of a custom, individualized bike seat from the 3D data file; or the custom, individualized bike seat produced thereby; or electronic actuation of the movements.

There is a need for a process, equipment, materials and a system to measure individuals' perineum, design and manufacture bike seats fit to the individual, monitor their comfort and safety and adjust or redo the seats as appropriate.

SUMMARY OF THE INVENTION

These and other objects were met with the present invention, which relates in a first embodiment to a device for use in manufacturing an individualized bicycle seat, the device comprising: (a) a plurality of individually moving parts, the sum of the individually moving parts in at least two dimensions defining at least a two-dimensional top surface of a generic bicycle seat, and the individually moving parts being movable relative to one another in the x-, y- and z-directions to adjust the generic bicycle seat from a starting point to an adjusted final position, wherein compared to the starting point the adjusted final position embodies individual comfort adjustments to the individually moving parts made by or on behalf of a person who will be the user of the individualized bicycle seat; and (b) a plurality of sensors connected to the plurality of individually moving parts, the plurality of sensors collectively detecting all adjustments made relative to the starting point to achieve the adjusted final position.

The present invention relates in a second embodiment to a method for manufacturing an individualized bicycle seat, the method comprising: (a) providing a device according to the present invention; (b) adjusting one or more of the plurality of individually moving parts from the starting point to the adjusted final position; and (c) detecting all adjustments made relative to the starting point to achieve the adjusted final position using the plurality of sensors.

The present invention relates in a third embodiment to an individualized bicycle seat prepared by the inventive method.

The present invention relates in a fourth embodiment to a bicycle comprising the inventive individualized bicycle seat.

The present invention relates in a fifth embodiment to an adjustable bicycle seat comprising: (a) a plurality of individually moving parts, the sum of said individually moving parts in at least two dimensions defining at least a two-dimensional top surface of a generic bicycle seat, and the individually moving parts being movable relative to one another in the x-, y- and z-directions to adjust the generic bicycle seat from a starting point to an adjusted final position, wherein compared to the starting point the adjusted final position embodies individual comfort adjustments to the individually moving parts made by or on behalf of a person who will be the user of said individualized bicycle seat; (b) a database comprising a plurality of settings of the adjusted final positions of a plurality of prior users; and (c) means for communicating settings contained in the database to and affecting movement of the individually moving parts to recreate the adjusted final position of each of said plurality of prior users one at a time on demand.

BRIEF DESCRIPTION OF THE DRAWINGS

The invention will now be described in greater detail with reference to the drawings, wherein:

FIG. 22C is a top view of the device according to FIG. 7 with both the front and rear slides in an open position.

DETAILED DESCRIPTION OF THE INVENTION

The device according to the present invention comprises a plurality of moving parts, the sum of which at least in two dimensions defines the top surface of a generic bicycle seat. By "generic bicycle seat" is meant simply a universal starting point to which user friendly adjustments are made. The plurality of moving parts will be moved relative to this universal starting point and checked periodically by the user for comfort until an adjusted final position is reached that embodies all the individual comfort adjustments made by the user or someone assisting the user.

Figure 1:
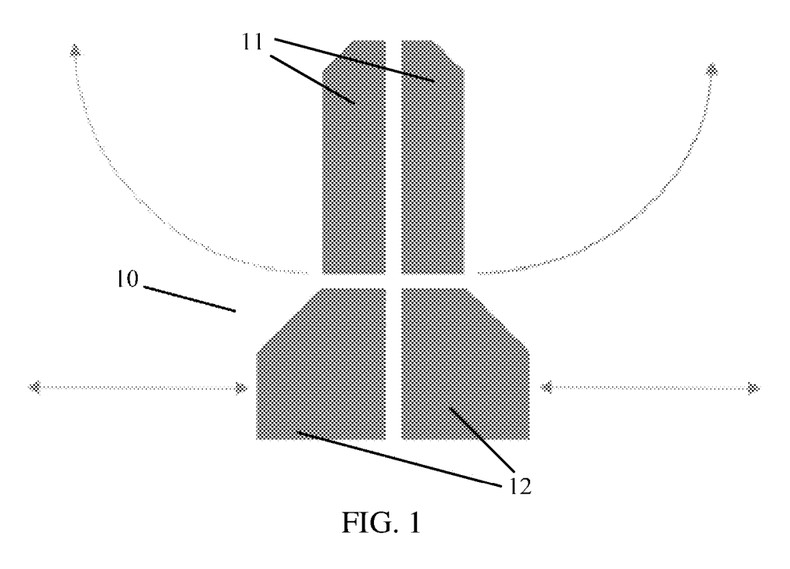
FIG. 1 is a schematic top view of a first embodiment of a testing device for individual measurement according to the present invention.

For example, FIG. 1 shows a generic bicycle seat 10 having four moving parts capable of independent movement. From this top view at least, the generic bicycle seat has a gross two-dimensional shape that resembles an ordinary bicycle seat. Preferably, the generic bicycle seat resembles an ordinary bicycle seat in all three dimensions.

The generic bicycle seat shown in FIG. 1 has two anterior moving parts 11 and two posterior moving parts 12. In this particular embodiment, the anterior parts 11 are movable in the z-direction relative to the posterior moving parts (as indicated by the curved arrows); and the posterior parts 12 are movable in the x-direction relative to the anterior parts (as indicated by the straight arrows). A user can adjust the individual moving parts to a position that suits his or her individual comfort tastes.

Figure 7:
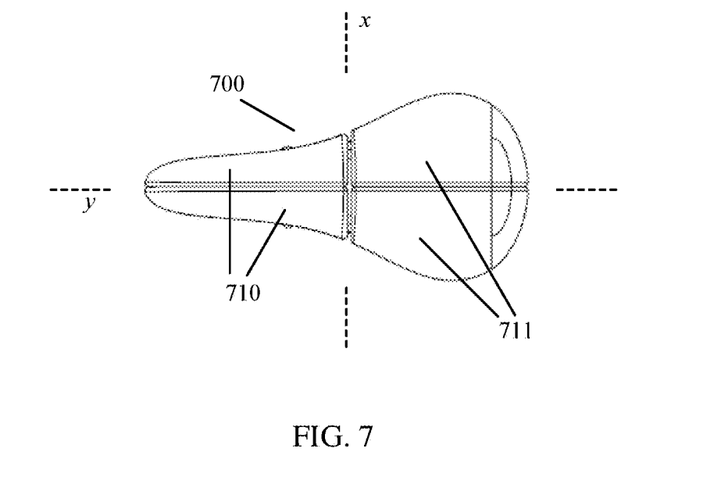
FIG. 7 is a top view of one embodiment of a device according to the present invention.

(The x-, y- and z-directions can be most clearly understood from FIG. 7, where the x- and y-directions are indicated by dotted lines. The z-direction is understood as extending into and out of the page at an angle perpendicular to the plane containing both the x- and y-axes.)

Thus, the two posterior parts 12 may move close to or away from each other on the horizontal transverse axis of the seat. This movement is envisioned to be tested by the individuals with instruction to place the sitz bones in the middle of posterior parts and adjust the position of the parts to individual comfort. Further adjustment may or may not include, in addition to the individual's comfort, data of pressure, blood flow and other measurements. The two anterior parts 12 may move in a rotating fashion with the centers of rotation at the anterior tips of the anterior parts. Such movement will provide the optimal individual position, shape and size of the anterior parts of the seat, in accordance with the individual's comfort. Further adjustment may or may not include, in addition to the individual's comfort, data of pressure, blood flow and other measurements. Data from the optimal positions of the anterior and posterior parts will define the shape and size of the final individual seat. Such data will be used for 3D-printing to manufacture an individually fit seat.

In an especially preferred embodiment, the multiple parts of the seat may be covered with a cover made of some material, for example, leather, plastic, textiles or some other suitable material, to provide the appearance and function of a one-part seat.

The thickness of the seat and the slope of the design may be fixed in the seat design or may be adjusted in a procedure similar to the above example.

In a preferred embodiment, the individual moving parts will connect via the sensors to a computer capable of saving information detected by the sensors as a 3D data file. The computer, in turn, is preferably linked to a 3D printer capable of printing the 3D file as a 3D product. The 3D product so printed can be finished, for example, with a cloth or leather covering and/or padding to form a finished, individualized bicycle seat.

In a preferred embodiment, the 3D data file will show the cover in electronic form.

In a particularly preferred embodiment, the generic bicycle seat prior to and during adjustment is positioned on a bicycle frame, optionally even the user's own bicycle frame, so that the user's assessment of comfort will be made in the proper context. The bicycle frame can be supported and rendered immobile by a bicycle stand so that the user can pedal the stationary bike and assess different adjustment settings throughout the course of a simulated ride.

Although the term "bicycle" has been used thus far in this explanation, for the purposes of the invention and the claims this means a bike, bicycle, tricycle, scooter, motorcycle, exercise bike, stationary bike, etc.

Likewise, although the term "seat" has been used thus far in this explanation, for the purposes of the invention and the claims this means a seat or saddle.

Figure 2:
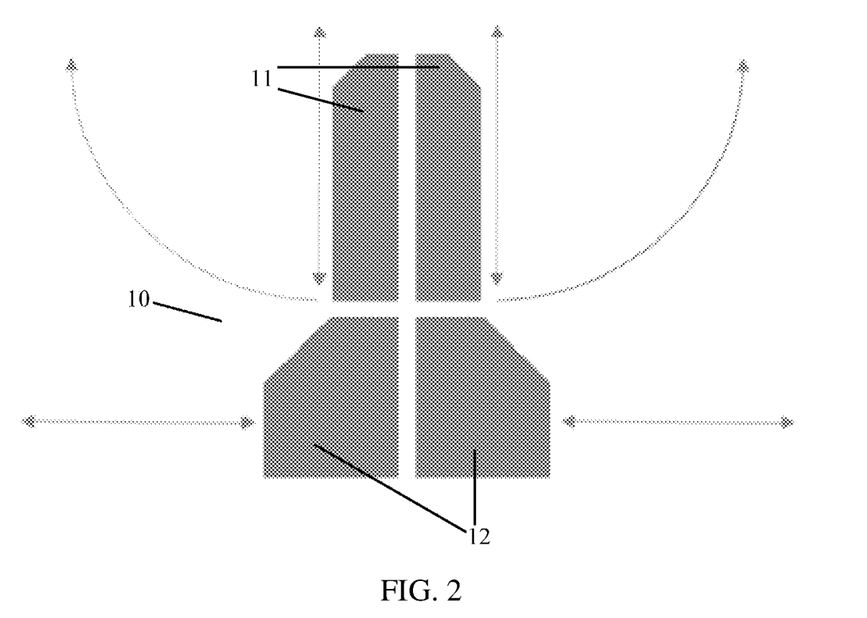
FIG. 2 is a schematic top view of a second embodiment of a testing device for individual measurement according to the present invention.
Figure 3:
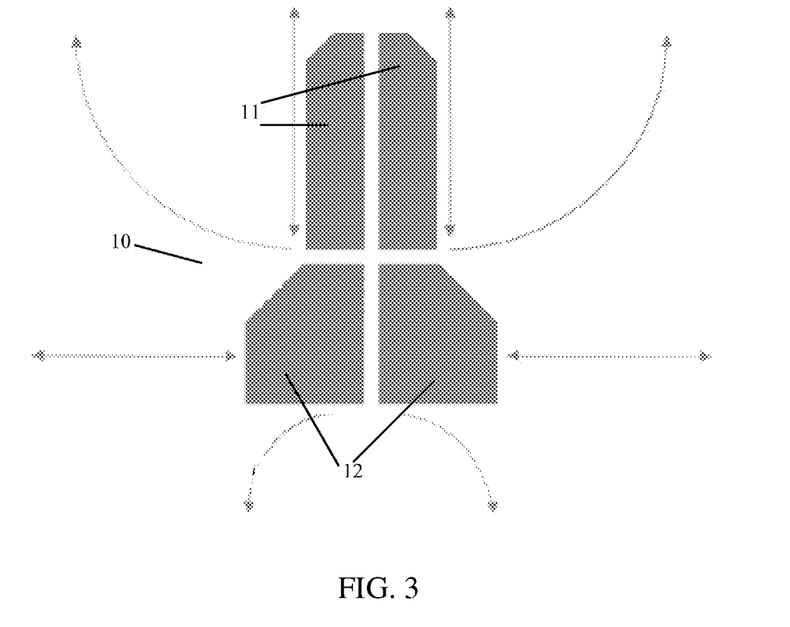
FIG. 3 is a schematic top view of a third embodiment of a testing device for individual measurement according to the present invention.
Figure 4:
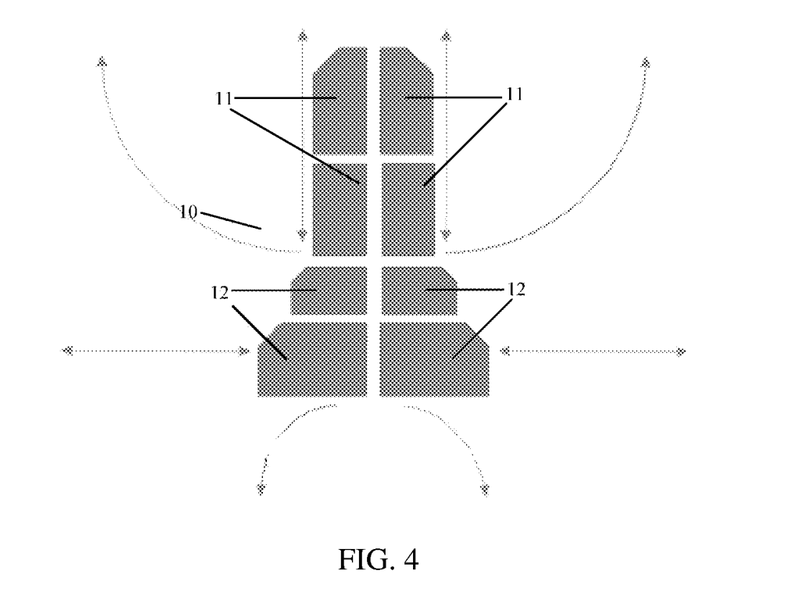
FIG. 4 is a schematic top view of a fourth embodiment of a testing device for individual measurement according to the present invention.
Figure 5:
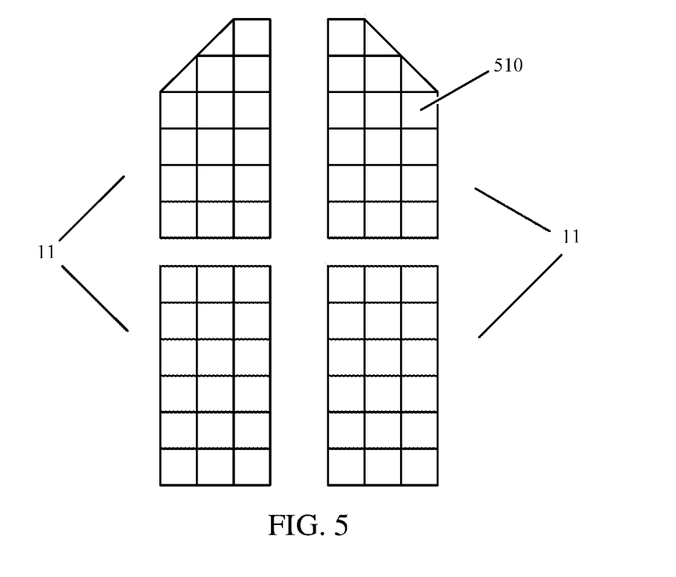
FIG. 5 is a schematic top view of a portion of a testing device for individual measurement according to the present invention.

As shown in FIGS. 2-4, the generic bicycle seat can vary in terms of the number of individually moving parts and their ranges of motion. In FIGS. 3 and 4, the parts of the seat may be moved in one, two or three dimensions (indicated by the arrows), ultimately creating a three-dimensional fit to the individual user and 3D electronic or digital file that can be used for 3D printing and manufacturing of individually fit bicycle seats. In FIG. 5, there are shown the anterior portions only each broken up into tiny blocks or "cells" 510. These cells 510 can be designed in any shape, size or volume and made moveable relative to one another to provide a precise assessment of user comfort with the manufactured individualized bicycle seat. In a particularly preferred embodiment, the cells 510 have a spherical shape.

In an embodiment, "the individually moving parts being movable relative to one another in the x-, y- and z-directions" means the parts are capable of such moving without needing to dismantle the device or a portion thereof (for example, remove a bolt), add to the device (for example, insert a shim), and reconfigure the device (for example, insert the bolt through the inserted shim and tighten). Instead, by manual or electrical actuation or the like, and without adding or inserting new components, for example, one or more shims, existing components of the existing device can be moved in the x-, y- and z-directions from a starting point to a new point to adjust the device.

In an embodiment, the y-direction movement is either a pivot around the x-axis, which moves the y-position slightly forward or backwards relative to the initial starting position, or else a sliding movement along the y-axis.

In this immediately preceding embodiment, or in a separate embodiment, the z-direction movement can either be carried out by a pivot around the x-axis, which moves the z-position up or down relative to the initial starting position, or else a sliding movement along the z-axis.

In an especially preferred embodiment, the y-direction and z-direction movements both comprise displacement by a pivot of the moving parts around the x-axis and the x-direction movement comprises sliding along the x-axis.

In one embodiment, the change in the z-direction is not a sliding along a horizontal surface that is angled so that at different positions the z-axis height will vary from the starting point.

Figure 6:
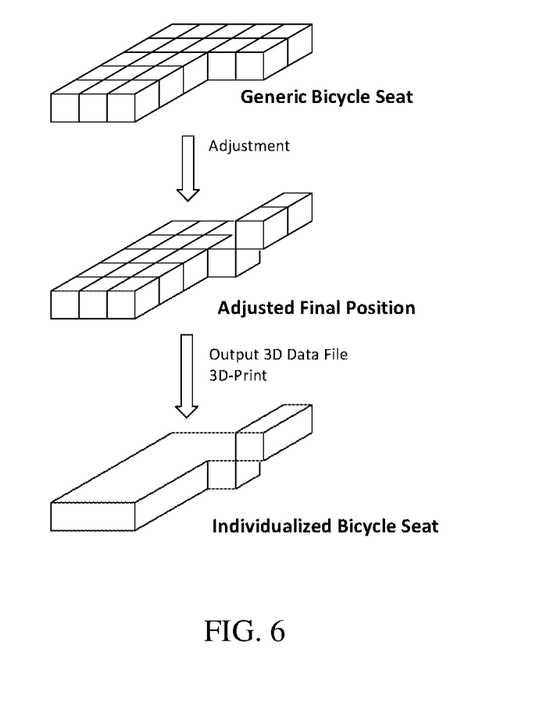
FIG. 6 is a schematic plan view of a method for individual measurement according to the present invention.

The method for individualizing the bicycle seat is depicted schematically in FIG. 6, expanding in this figure on the small cell concept depicted in FIG. 5. The method begins with the generic bicycle seat, which is the universal starting point for all users. A new user begins with the generic bicycle seat and adjusts the cells as necessary to suit his or her individual comfort tastes to yield an adjusted final position, which is sum of all of the comfort adjustments made by the user. This adjusted final position is captured by the plurality of sensors and communicated to a computer that saves the information as a 3D data file. This 3D data file is subsequently 3D-printed to yield the individualized bicycle seat, which may optionally be further finished, for example, with padding or a cloth or leather cover.

In an alternative embodiment, the 3D printing is only a portion of the individualized bicycle seat, for example, the 3D contour of the portion that actually makes contact with the body of the user, with the remainder being a stock block bottom portion that engages the seat post and on which the 3D contour is 3D-printed.

If completely 3D-printed, it will eliminate the current processes of metal rails attached to injection molded base with foam glued to the base then covered with leather. Multiple materials may be used in the sequential 3D-printing process.

In an especially preferred embodiment, it is envisioned that the inventive device may be useful in the following manner of doing business: A stationary testing device will be placed at "certified" bicycle shops. An interested individual will be directed to go a certified bicycle shop to get tested. At the certified bicycle shop, the individual will "ride" on the testing device. The parts of the seat of the testing device will be adjusted by the "rider" or an assisting employee of the bicycle shop to create the individualized seat setting and individualized 3D data file in the computer. The individualized 3D data file will be sent to a 3D printing and manufacturing facility. The facility will 3D print and manufacture the individualized seat and ship it to the individual or to the bicycle shop. Thus, in this embodiment, the testing device will remain at the certified bicycle shops for testing, collection of data and creation of the 3D data file in the computer in addition to ordering the seat and collecting payment, etc., and 3D printing of the individualized bicycle seat will occur at a different site.

Advantageously, the system can store a user's individual comfort preferences for future use. For example, if the user should desire to purchase a new bicycle seat with the same comfort settings, the user need only recall the previous setting and 3D-print a new bicycle seat. On the other hand, should the user need to change the previous adjustment settings, the previous adjustment settings can be recreated in the generic bicycle seat and then new adjustments made to produce a new adjusted final position that is 3D-printed to a new bicycle seat.

The ability to recreate the previous adjustment settings affords an adjustable bicycle seat, which is capable of recreating the previous adjustment settings and, thus, comfort settings, of a previous single user, or a plurality of previous users. For example, in spinning classes, each stationary bicycle is currently used by different various individuals every day. An adjustable bicycle seat will allow each of the previous users of the adjustable bicycle seat to recreate that user's previous comfort settings, similar to adjustable car seats. This requires in one embodiment a database of prior user settings and means of connecting the database to the adjustable bicycle seat and means for signaling the movement and the actual movement of individual cells into a recreated prior position. Alternatively, adjustments here and in the other embodiments discussed above might be performed manually and the user can with the use of knobs or levers and the like manipulate the individual moving parts (or a block of some portion less than the whole of the moving parts) into a position previously preferred by the user. Positions of individual moving parts or of the block of moving parts might, for example, be assigned numbers, so that the collected positions of all of the individual moving parts and all of the blocks define a code number that the user can remember and then "dial up" upon the next use of the device. For example, assuming four moving parts, each of which has a range of settings designated 1-5, a user code for a desired prior comfort setting might be "5322," with each digit corresponding to a setting for each individual moving part. This code can be dialed up manually by the user the next time the device is used to adjust the device from any starting point to the comfort settings previously enjoyed by the user.

In one embodiment, the present invention relates to a device for use either in manufacturing an individualized bicycle seat or as an adjustable bicycle seat itself, the device comprising:

(a) a seat base;

(b) a front platform mounted on the seat base, the front platform in a front platform starting position positioned above and extending substantially parallel to the seat base, wherein the front platform is mounted to the seat base in such a way that the front platform can pivot up or down from the front platform starting position;

(c) a back platform mounted on the seat base, the back platform in a back platform starting position positioned above and extending substantially parallel to the seat base, wherein the back platform is mounted to the seat base in such a way that the back platform can pivot up or down from the back platform starting position;

(d) a plurality of front slides positioned above and movably connected to the front platform, each of the front slides being movable laterally from a front slide starting position to a front slide displaced position and from a front slide displaced position to the front slide starting position;

(e) a plurality of back slides positioned above and movably connected to the back platform, each of the back slides being movable laterally from a back slide starting position to a back slide displaced position and from a back slide displaced position to the back slide starting position;

(f) a plurality of saddle components mounted on the front and back slides, and thereby movable in the same manner as the front and back slides, the plurality of saddle components in the aggregate having the surface contours of a generic bicycle seat; and (g) optionally a covering over the plurality of saddle components.

FIG. 7 is a top view of one embodiment of such a device. Viewed from above, device 700 comprises two anterior saddle portions 710 and two posterior saddle portions 711.

Figure 8:
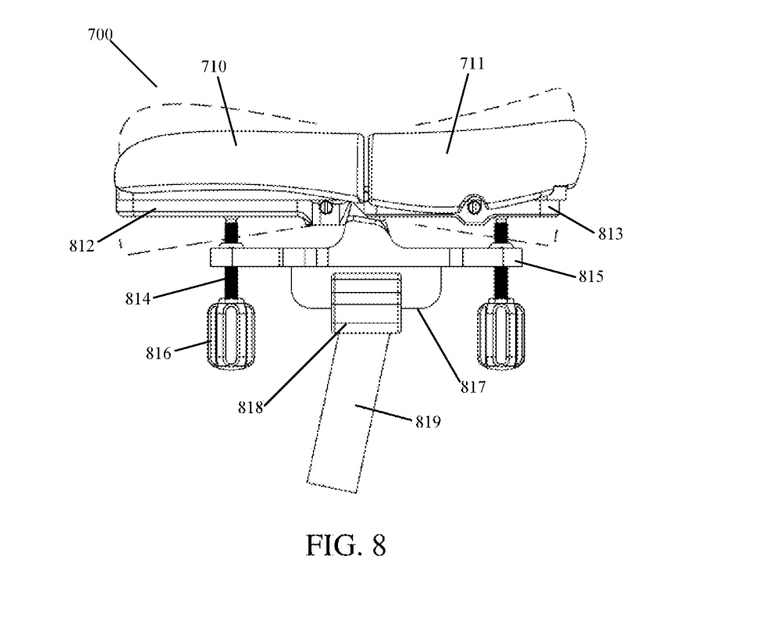
FIG. 8 is a side view of the device according to FIG. 7.
Figure 9:
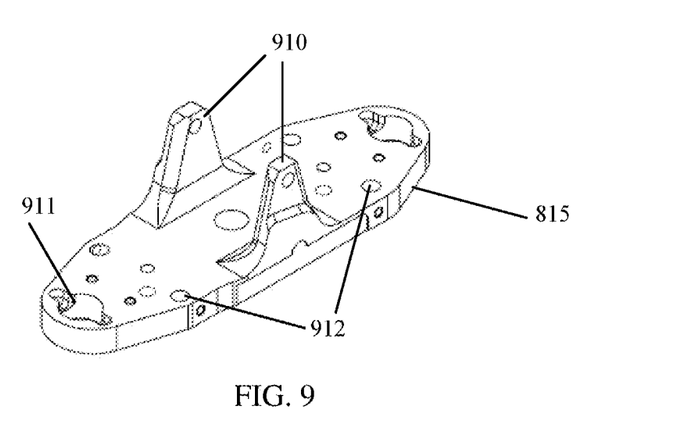
FIG. 9 is a perspective view of a seat base portion of the device according to FIG. 7.
Figure 20:
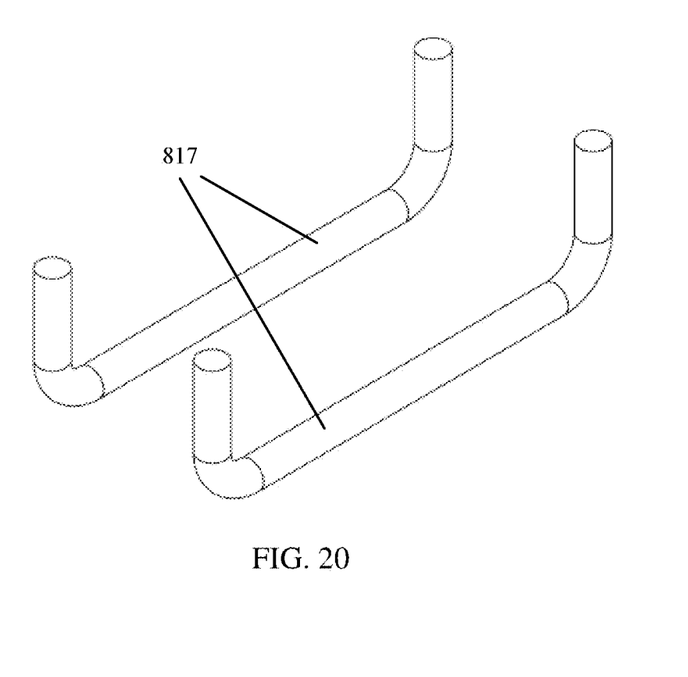
FIG. 20 is a perspective view of the rail portion of the device according to FIG. 7.

FIG. 8 shows a side view of the device 700. Device 700 is mounted to clip 818 of bike post 819 by a pair of rails 817 (shown in greater detail in FIG. 20), which support seat base 815. Referring to FIG. 9, seat base 815 contains two platform mounts 910. Referring again to FIG. 8, the platform mounts 910 support front platform 812 and back platform 813, on which anterior saddle portions 710 and posterior saddle portions 711 are mounted. The anterior saddle portions 710 along with the front platform and posterior saddle portions 711 along with the back platform are capable of independent movement up and down with respect to the seat base 815, as indicated by the dashed lines. In this particular embodiment, this up and down movement is regulated by manually turning threaded posts 814 with the aid of handle 816.

Figure 10:
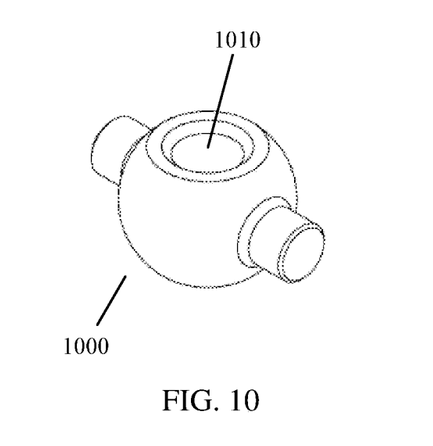
FIG. 10 is a perspective view of a threaded ball portion of the device according to FIG. 7.
Figure 11:
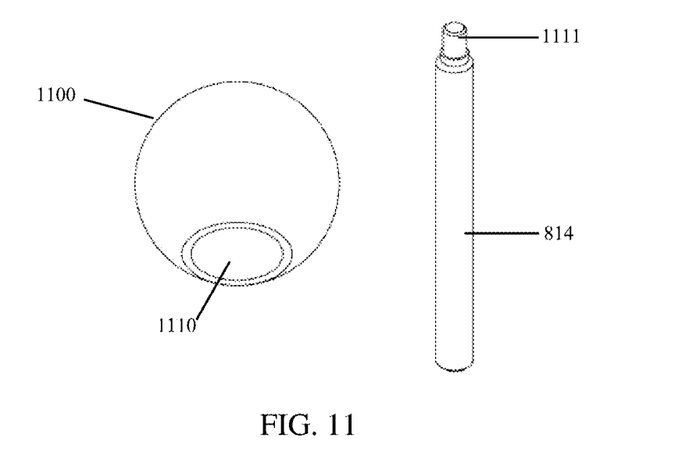
FIG. 11 are perspective views of threaded post and post cap portions of the device according to FIG. 7.

As shown in FIG. 9, seat base contains holes 912 for rails 817 and also a ball socket 911 for threaded ball 1000 shown in FIG. 10. Referring to FIG. 11, threaded post 814 has a coronal portion 1111, which engages with post receptacle 1110 of post cap 1100. The threads of threaded post 814 engage the threads of threaded ball 1000 permitting the threaded post to be turned clockwise or counter-clockwise relative to the seat base, respectively, lengthening or decreasing the height of threaded post 814 above the seat base. In use, post cap 1100 abuts the underside of front platform 812 and back platform 813, smoothing out the up and down movements of the platforms relative to the seat base. Dimples (not shown) a provided on the underside of the platforms to engage post cap 1100 and threaded ball 1000 is free to turn in ball socket 911 to ensure the post cap 1100 is retained in the dimples as the height of threaded post 814 shortens and lengthens.

Figure 12:
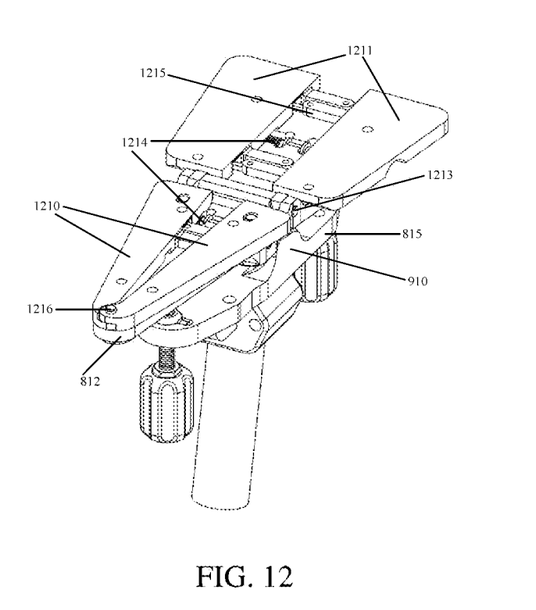
FIG. 12 is a perspective view of the device according to FIG. 7 without the saddle portions installed.

FIGS. 12-18 illustrate the superstructure of the platforms and the workings thereof. As shown in FIG. 12, right and left front slides 1210 are mounted on front platform 812 and right and left back slides 1211 are mounted on back platform 813. The two front slides 1210 are connected to front platform 812 and are capable of scissors-like movement from a closed starting position to an open position and back again, although other types of movements, for example, a simple lateral separation as shown for the back slides 1211, are also possible. The two back slides 1211 sit above the back platform 813 and are capable of a lateral movement from a closed starting position to an open position and back again, although, here, again, other movements are possible. With respect to the movements described here, what is most important is that the front slides can be displaced from one another and brought back together again, and the back slides can be manipulated similarly. Persons skilled in the art would be capable of configuring the device in many different ways to accomplish the desired results. The two platforms are mounted to the seat base 815 through platform mount 910 via bolt 1213 and, thereby, capable of pivoting up and down relative to the seat base 815.

Figure 13:
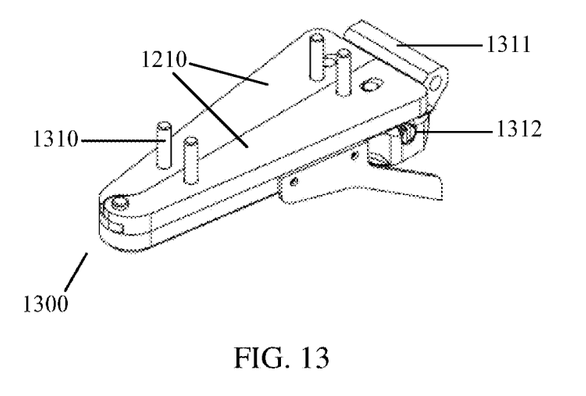
FIG. 13 is a perspective view of a front platform unit portion of the device according to FIG. 7.
Figure 14:
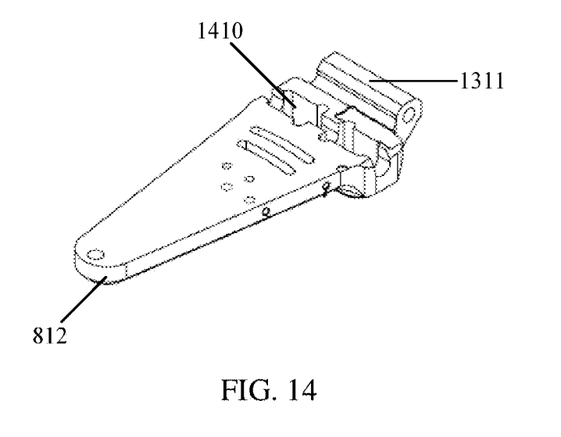
FIG. 14 is a perspective view of a front platform portion of the device according to FIG. 7.
Figure 15:
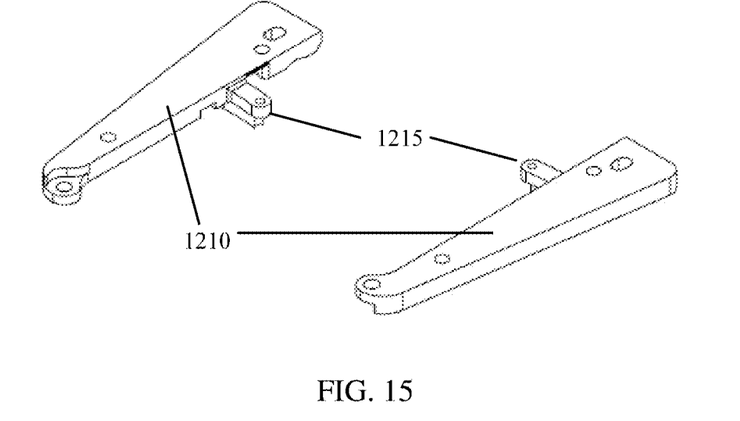
FIG. 15 is a perspective view of the front slides portion of the device according to FIG. 7.

FIG. 15 depicts front slides 1210 having complementary guides 1215. The two front slides 1210 are mounted on front platform 812, which is depicted in FIG. 14. The front platform 812 contains a receptacle 1410 for a dual-turning screw 1214, shown in FIG. 19; and a duct 1311 for bolt 1213. FIG. 13 shows the combined front unit 1300. The drive 1312 of dual-turning screw 1214 projects from both sides toward the rear of the unit and can be engaged, for example, by a screwdriver head to turn the screw 1214 to move the front slides 1210 apart or together. A number of posts 1310 also project from the front slides 1210 to engage with the front saddle portions 710 (not shown) so that the front saddle portions 710 move in tandem with the front slides 1210.

Figure 16:
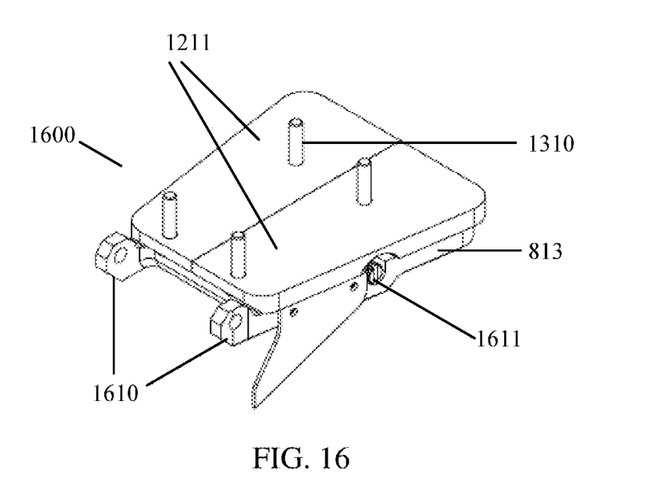
FIG. 16 is a perspective view of a back platform unit portion of the device according to FIG. 7.
Figure 17:
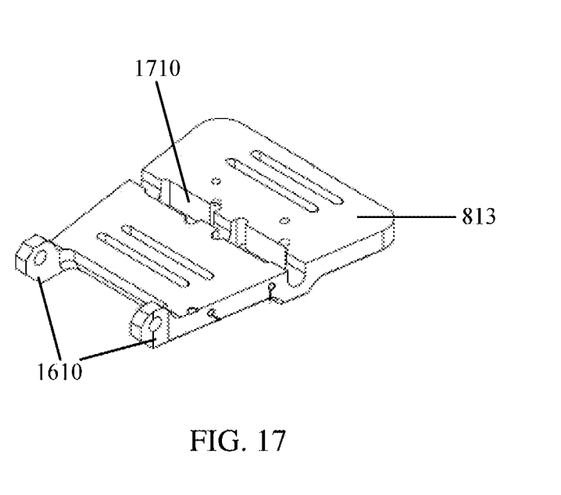
FIG. 17 is a perspective view of a back platform portion of the device according to FIG. 7.
Figure 18:
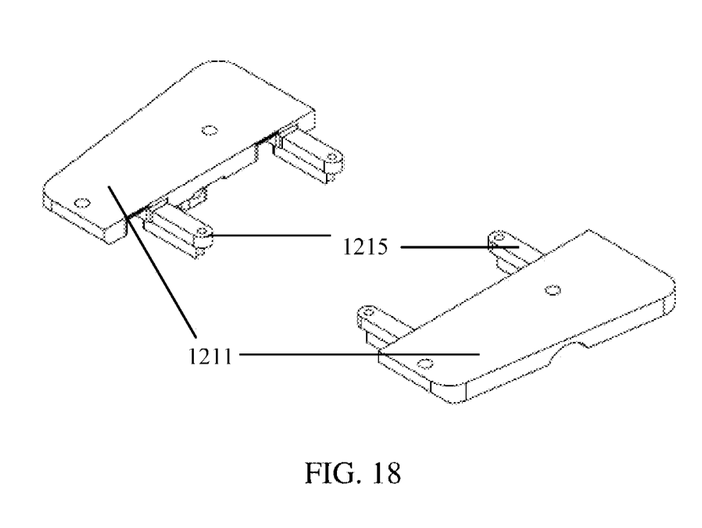
FIG. 18 is a perspective view of the back slides portion of the device according to FIG. 7.

A similar construction of the back unit 1600 can be gleaned from FIGS. 16-18. The two back slides 1211, shown in FIG. 18, are mounted on back platform 813, which is depicted in FIG. 17. The back platform 813 contains a receptacle 1710 for a second dual-turning screw 1214; and two holes 1610 for bolt 1213. The combined back unit 1600 is shown in FIG. 16. The drive 1611 of dual-turning screw 1214 projects from both sides of the combined back unit 1600 and can be manipulated with a screwdriver to move the slides 1211 laterally apart or together, as the case warrants. Again, a number of posts 1310 project from the back slides 1211 to engage with the back saddle portions 711 (not shown) so that the back saddle portions 711 move in tandem with the back slides 1211.

Figure 19:
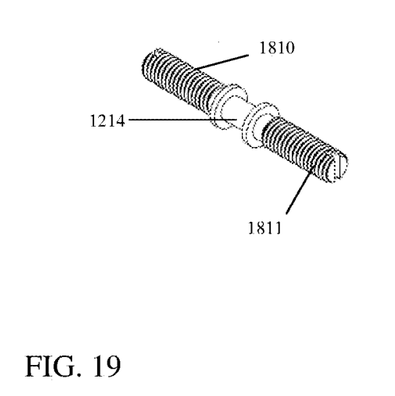
FIG. 19 is a perspective view of a dual-turning screw portion of the device according to FIG. 7.

FIG. 19 shows the dual-turning screw 1214. One end contains left-turning threads 1810, while the opposite end contains right-turning threads 1811, so that turning the screw in one direction will simultaneously move the right and left slides away from one another, while turning the screw in the opposite direction will simultaneously move the right and left slides towards one another.

Given the foregoing, the workings of the device should be fully understood, particularly after a consideration of FIG. 8 and FIGS. 22A, 22B and 22C. As shown in FIG. 8, as indicated by the dashed lines, the combination of front platform 812 and front saddle portions 710 are capable of up and down movement relative to the seat base 815. In like manner, the combination of back platform 813 and back saddle portions 711 are also capable of up and down movement relative to the seat base 815. Importantly, the up and down movement of the combination of front platform 812 and front saddle portions 710 are independent of the up and down movement of the combination of back platform 813 and back saddle portions 711. In addition to this, as should be apparent from FIGS. 22A, 22B and 22C, dual-turning screws 1214 in the rear unit (FIG. 22B) and in the front unit (FIG. 22C) can be manipulated independently to separate the rear slides and front slides to a desired degree. The combination of available movements permits the contour of the combined saddle portions to be fine-adjusted to suit the comfort of individual users.

Although FIGS. 7-22 describe a manually-operated device, any of the foregoing movements could easily be mechanized and controlled, for example, with a remote control unit. The present invention contemplates both manual and electronic operation, and, specifically, each of the foregoing embodiments adapted to electronic, mechanized operation using motors and manual controls (e.g., buttons, or levers or switches) or remote controls.

Figure 21:
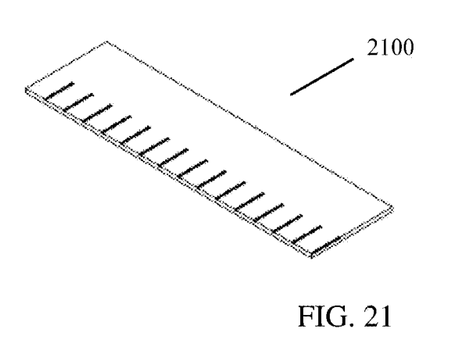
FIG. 21 is a perspective of a ruler portion of the device according to FIG. 7.
Figure 22A:
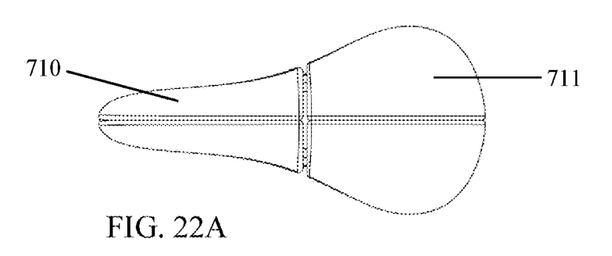
FIG. 22C is a top view of the device according to FIG. 7 in a closed position.
FIG. 22B is a top view of the device according to FIG. 7 with the rear slides opened.
Figure 22B:
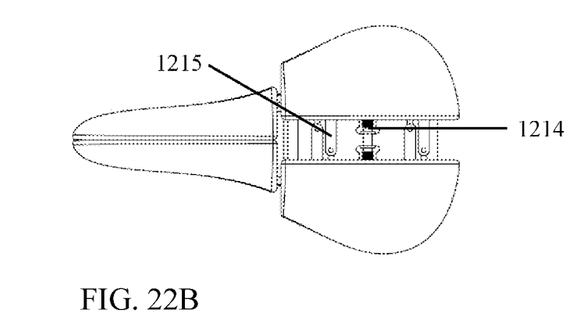
Figure 22C:
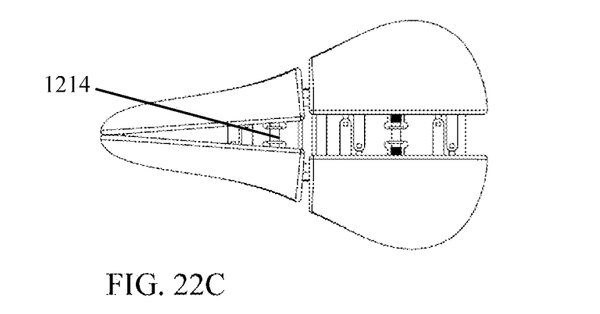

This construct can be used per se as an adjustable bicycle seat. Alternatively, the desired displacement of the various parts from a starting position can be measured and fed to a computer program and the data used to inform a 3D data file, from which a personalized bicycle seat can be 3D printed. The measurement can be with any suitable sensor and, for example, rulers (shown in FIG. 21 and capable of being adhered to the device) or optical sensors can be placed to detect the degree of displacement with great accuracy. Other sensors that may be used include pressure, mechanical, electrical, magnetic and thermal sensors. Where a ruler is used, the displacement can be noted and the measurements fed to a computer program that will automatically convert the data to a customized seat contour. Where an electrical or optical sensor is used, the data can be transmitted directly from the sensor to the computer with the same effect.

In one embodiment, sensors (ruler, optical sensors, etc.) are positioned at various points of the device so as to record or indicate any displacement from the starting position in all three x-, y- and z-directions.

In the embodiments where the device is intended to be used as an adjustable bicycle seat, there may be no need for sensors and, accordingly, the requirement of sensors may be optionally deleted from such embodiments, which are otherwise as described hereinabove.

While the present invention has been described in conjunction with the specific embodiments set forth above, many alternatives, modifications and other variations thereof will be apparent to those of ordinary skill in the art. All such alternatives, modifications and variations are intended to fall within the spirit and scope of the present invention.

What is claimed is:

1. A device comprising: (a) a plurality of individually moving parts, the sum of said individually moving parts in at least two dimensions defining at least a two-dimensional top surface of a bicycle seat, and the individually moving parts being movable relative to one another in the x-, y- and z-directions to adjust the bicycle seat from a starting point to an adjusted final position, wherein compared to the starting point the adjusted final position embodies individual comfort adjustments to the individually moving parts made by or on behalf of a person who will be the user of said individualized bicycle seat; and (b) a plurality of sensors connected to the plurality of individually moving parts, the plurality of sensors collectively detecting all adjustments made relative to said starting point to achieve said adjusted final position.

2. The device according to claim 1, comprising:
   (a) a seat base;
   (b) a front platform mounted on said seat base, the front platform in a front platform starting position positioned above and extending substantially parallel to the seat base, wherein the front platform is mounted to the seat base in such a way that the front platform can pivot up or down from said front platform starting position;
   (c) a back platform mounted on said seat base, the back platform in a back platform starting position positioned above and extending substantially parallel to the seat base, wherein the back platform is mounted to the seat base in such a way that the back platform can pivot up or down from said back platform starting position;
   (d) a plurality of front slides positioned above and movably connected to said front platform, each of the front slides being movable laterally from a front slide starting position to a front slide displaced position and from a front slide displaced position to said front slide starting position;
   (e) a plurality of back slides positioned above and movably connected to said back platform, each of the back slides being movable laterally from a back slide starting position to a back slide displaced position and from a back slide displaced position to said back slide starting position;
   (f) a plurality of saddle components mounted on the front and back slides, and thereby movable in the same manner as the front and back slides, the plurality of saddle components in the aggregate having the surface contours of a bicycle seat; and
   (g) optionally a covering over the plurality of saddle components.

3. The device according to claim 2, which further comprises at least one rail extending beneath the seat base for securing the device to a bicycle seat clip.

4. The device according either claim 2, which further either (A) comprises a rod or screw connected to the seat base for adjusting the position of the front platform up or down from said front platform starting position, or for adjusting the position of the back platform up or down from said back platform starting position, or else (B) is motorized to accomplish such adjusting.

5. The device according to claim 2, which further either (A) comprises a dual-threaded screw positioned between a topside of the front platform and an underside of two adjacent front slides for adjusting the lateral position of said two adjacent front slides relative to one another, or positioned between a topside of the back platform and an underside of two adjacent back slides for adjusting the lateral position of said two adjacent back slides, the dual-threaded screw having right-turning screw threads on one end of the screw and left-turning screw threads on an opposite end of the screw, or else (B) is motorized to accomplish such adjusting.

6. The device according to claim 2, which is for use in manufacturing an individualized bicycle seat, and further comprises either (A) a ruler for measuring a displacement of the front platform up or down from said front platform starting position, or for measuring a displacement of the back platform up or down from said back platform starting position, or (B) a ruler for measuring a displacement of the front slides from the front slide starting position, or for measuring a displacement of the back slides from the back slide staring position, or (C) sensors, electronics or optics to accomplish all or at least some of such measuring.

7. The device according to claim 2, which is for use as an adjustable bicycle seat, and is adapted for manual or motorized adjustment of the platforms and slides.

8. The device according to claim 7, which further comprises (A) at least one motor for motorized adjustment of at least one platform or at least one set of slides and (B) an electronic storage device operably linked to said at least one motor for storing at least one individual user platform or slides adjustment settings.

9. The device according to claim 1, which further comprises a computer capable of saving information detected by said plurality of sensors as a 3D data file.

10. The device according to claim 1, which further comprises a 3D printer operably linked to said computer and capable of converting said 3D data file to said individualized bicycle seat.

11. The device according to claim 1, wherein said bicycle seat is positioned on a bicycle frame.

12. The device according to claim 1, wherein said bicycle seat resembles a bicycle seat in all three dimensions.

13. The device according to claim 1, wherein the plurality of individually moving parts are covered by a piece of material so that the plurality of individually moving parts collectively has the outward appearance of a single, integrated bicycle seat.

14. A method for manufacturing an individualized bicycle seat, said method comprising: (a) providing a device according to claim 1; (b) adjusting one or more of said plurality of individually moving parts from said starting point to said adjusted final position; and (c) detecting all adjustments made relative to said starting point to achieve said adjusted final position using said plurality of sensors.

15. The method according to claim 14, which further comprises: (d) saving information detected by said plurality of sensors as a 3D data file; and (e) converting said 3D data file to said individualized bicycle seat.

16. An individualized bicycle seat prepared by the method according to claim 14.

17. A bicycle comprising an individualized bicycle seat according to claim 16.

18. Method of using a device according to claim 1 as an adjustable bicycle seat itself.

19. An adjustable bicycle seat comprising: (a) a plurality of individually moving parts, the sum of said individually moving parts in at least two dimensions defining at least a two-dimensional top surface of a bicycle seat, and the individually moving parts being movable relative to one another in the x-, y- and z-directions to adjust the bicycle seat from a starting point to an adjusted final position, wherein compared to the starting point the adjusted final position embodies individual comfort adjustments to the individually moving parts made by or on behalf of a person who will be the user of said individualized bicycle seat; (b) a database comprising a plurality of settings of the adjusted final positions of a plurality of prior users; and (c) means for communicating settings contained in the database to and affecting movement of the individually moving parts to recreate the adjusted final position of each of said plurality of prior users one at a time on demand.

20. A bicycle comprising the adjustable bicycle seat according to claim 19.

* * * * *